(12) United States Patent
Tsuchiya (10) Patent No.: US 11,951,852 B2
(45) Date of Patent: Apr. 9, 2024

(54) CHARGING APPARATUS

(71) Applicant: TOYOTA JIDOSHA KABUSHIKI KAISHA, Aichi-ken (JP)

(72) Inventor: Yoshiyuki Tsuchiya, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 227 days.

(21) Appl. No.: 17/555,506

(22) Filed: Dec. 20, 2021

(65) Prior Publication Data

US 2022/0258627 A1  Aug. 18, 2022

(30) Foreign Application Priority Data

Feb. 15, 2021  (JP) ................. 2021-021615

(51) Int. Cl.
*B60L 53/16* (2019.01)
*B60L 53/20* (2019.01)
*B60L 53/66* (2019.01)

(52) U.S. Cl.
CPC ............ *B60L 53/16* (2019.02); *B60L 53/20* (2019.02); *B60L 53/66* (2019.02)

(58) Field of Classification Search
CPC .......... B60L 53/16; B60L 53/20; B60L 53/66
USPC ..................................................... 320/109
See application file for complete search history.

(56) References Cited

U.S. PATENT DOCUMENTS

| 9,561,731 | B2 * | 2/2017 | Johnson | ........ G06Q 10/06315 |
| 2015/0239361 | A1 * | 8/2015 | Niizuma | ................. H02J 50/12 |
| | | | | 320/108 |
| 2016/0207406 | A1 * | 7/2016 | Kauffmann | ............. B60L 53/30 |
| 2018/0339597 | A1 * | 11/2018 | Kruszelnicki | ......... B60L 53/305 |
| 2022/0289048 | A1 * | 9/2022 | Masuyama | .......... B60L 3/0015 |
| 2023/0024229 | A1 * | 1/2023 | Yokoyama | ............. H02J 50/80 |

FOREIGN PATENT DOCUMENTS

| EP | 4105066 A1 * | 12/2022 | ........... B60L 53/126 |
| JP | 2011109807 A | 6/2011 | |
| WO | WO-2016156567 A2 * | 10/2016 | ......... B60L 11/1816 |
| WO | WO-2019215423 A1 * | 11/2019 | ............. B60L 53/14 |

* cited by examiner

*Primary Examiner* — Suresh Memula
(74) *Attorney, Agent, or Firm* — HAUPTMAN HAM, LLP

(57) ABSTRACT

A charging apparatus includes a movable unit, an ascending and descending device, a detection device, and a control device. The movable unit includes a connection device configured to connect to a power storage device. The ascending and descending device causes the movable unit to ascend or descend between a first state and a second state. The first state is a state in which the movable unit is housed under the ground. The detection device detects an obstacle above the movable unit. The control device prohibits ascent of the movable unit when determination is made that the movable unit is in the first state and the obstacle is present above the movable unit based on a detection result from the detection device.

11 Claims, 9 Drawing Sheets

CHARGING APPARATUS

CROSS-REFERENCE TO RELATED APPLICATION

This application claims priority to Japanese Patent Application No. 2021-021615 filed on Feb. 15, 2021, incorporated herein by reference in its entirety.

BACKGROUND

1. Technical Field

The present disclosure relates to a charging apparatus configured to charge an on-board power storage device.

2. Description of Related Art

Charging apparatuses for charging power storage devices mounted on vehicles or the like are installed at parking lots or sidewalks outside the vehicles or the like. However, the charging apparatuses may hinder pedestrians from walking or vehicles from traveling because the charging apparatuses occupy installation spaces. Therefore, there is known a technology in which the charging apparatus is movable and housed, for example, under the ground.

For example, Japanese Unexamined Patent Application Publication No. 2011-109807 (JP 2011-109807 A) discloses a charging pole ascendable or descendable to stand on the ground or to be housed under the ground.

SUMMARY

The movable charging apparatus ascendable and descendable as described above may automatically stand on the ground to improve convenience. When the charging apparatus is caused to automatically ascend but an obstacle is present above the charging apparatus housed under the ground, the obstacle may come into contact with the charging apparatus to put a load on an ascending and descending mechanism, thereby causing malfunction in the charging apparatus.

The present disclosure provides a charging apparatus that suppresses malfunction when an obstacle is present above the charging apparatus.

A charging apparatus according to one aspect of the present disclosure is installed at a bottom of a hollow in a ground and configured to charge a power storage device mounted on a vehicle. The charging apparatus includes a movable unit, an ascending and descending device, a detection device, and a control device. The movable unit includes a connection device configured to connect to the power storage device. The ascending and descending device is configured to cause the movable unit to ascend or descend between a first state and a second state. The first state is a state in which the movable unit is housed under the ground. The second state is a state in which the movable unit is exposed above the ground and the power storage device and the connection device are connectable together. The detection device is configured to detect an obstacle above the movable unit. The control device is configured to control operations of the ascending and descending device. The control device is configured to prohibit ascent of the movable unit when determination is made that the movable unit is in the first state and the obstacle is present above the movable unit based on a detection result from the detection device.

In the charging apparatus according to the one aspect of the present disclosure, the ascent of the movable unit is prohibited when determination is made that the obstacle is present above the movable unit. Therefore, the load on the ascending and descending device is suppressed. As a result, the malfunction of the charging apparatus can be suppressed.

In the charging apparatus according to the one aspect of the present disclosure, the control device may be configured to communicate with a device outside the charging apparatus. The control device may be configured to, when the ascent of the movable unit is prohibited, transmit information on an inquiry about whether to permit the ascent of the movable unit to the device outside the charging apparatus. The control device may be configured to terminate prohibition of the ascent of the movable unit when information indicating permission of the ascent of the movable unit is received from the device outside the charging apparatus.

In the charging apparatus according to the one aspect of the present disclosure, the operations of the ascending and descending device can be controlled to switch the movable unit from the first state to the second state in response to a user's request.

In the charging apparatus according to the one aspect of the present disclosure, the detection device may be configured to detect a weight of the obstacle placed on a top surface of the movable unit. The control device may be configured to determine that the obstacle is present above the movable unit when the weight of the obstacle detected by using the detection device is larger than a first threshold.

In the charging apparatus according to the one aspect of the present disclosure, whether the obstacle is present above the movable unit can be determined with high accuracy by using the detection device.

In the charging apparatus according to the one aspect of the present disclosure, the detection device may be configured to detect a condition amount corresponding to a movement amount of the movable unit. The control device may be configured to determine that the obstacle is present above the movable unit when the movement amount of the movable unit based on a result of detection of the condition amount during application of an ascending force to the movable unit in the first state using the ascending and descending device is smaller than a second threshold.

In the charging apparatus according to the one aspect of the present disclosure, whether the obstacle is present above the movable unit can be determined with high accuracy by using the detection device.

In the charging apparatus according to the one aspect of the present disclosure, the detection device may be configured to detect a distance from the obstacle above the movable unit. The control device may be configured to determine that the obstacle is present above the movable unit when the distance detected by using the detection device is smaller than a third threshold.

In the charging apparatus according to the one aspect of the present disclosure, whether the obstacle is present above the movable unit can be determined with high accuracy by using the detection device.

According to the one aspect of the present disclosure, it is possible to provide the charging apparatus that suppresses malfunction when an obstacle is present above the charging apparatus.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure is described below in detail with reference to the drawings. In the drawings, the same or corresponding parts are represented by the same reference symbols to omit redundant description.

Figure 1:
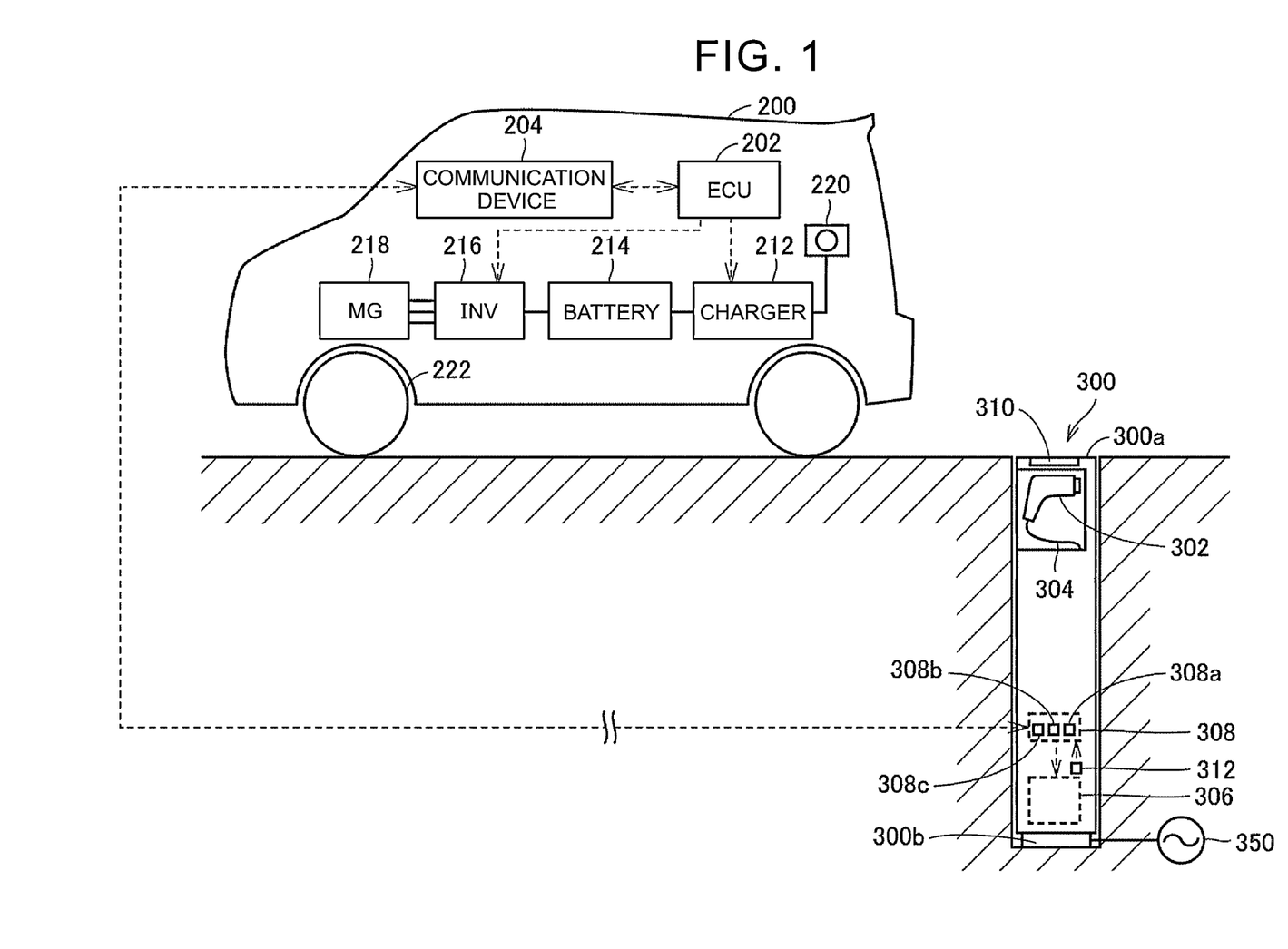
FIG. 1 is a diagram illustrating an example of the structures of a motor vehicle and a charging stand whose movable unit is housed under the ground.
Figure 2:
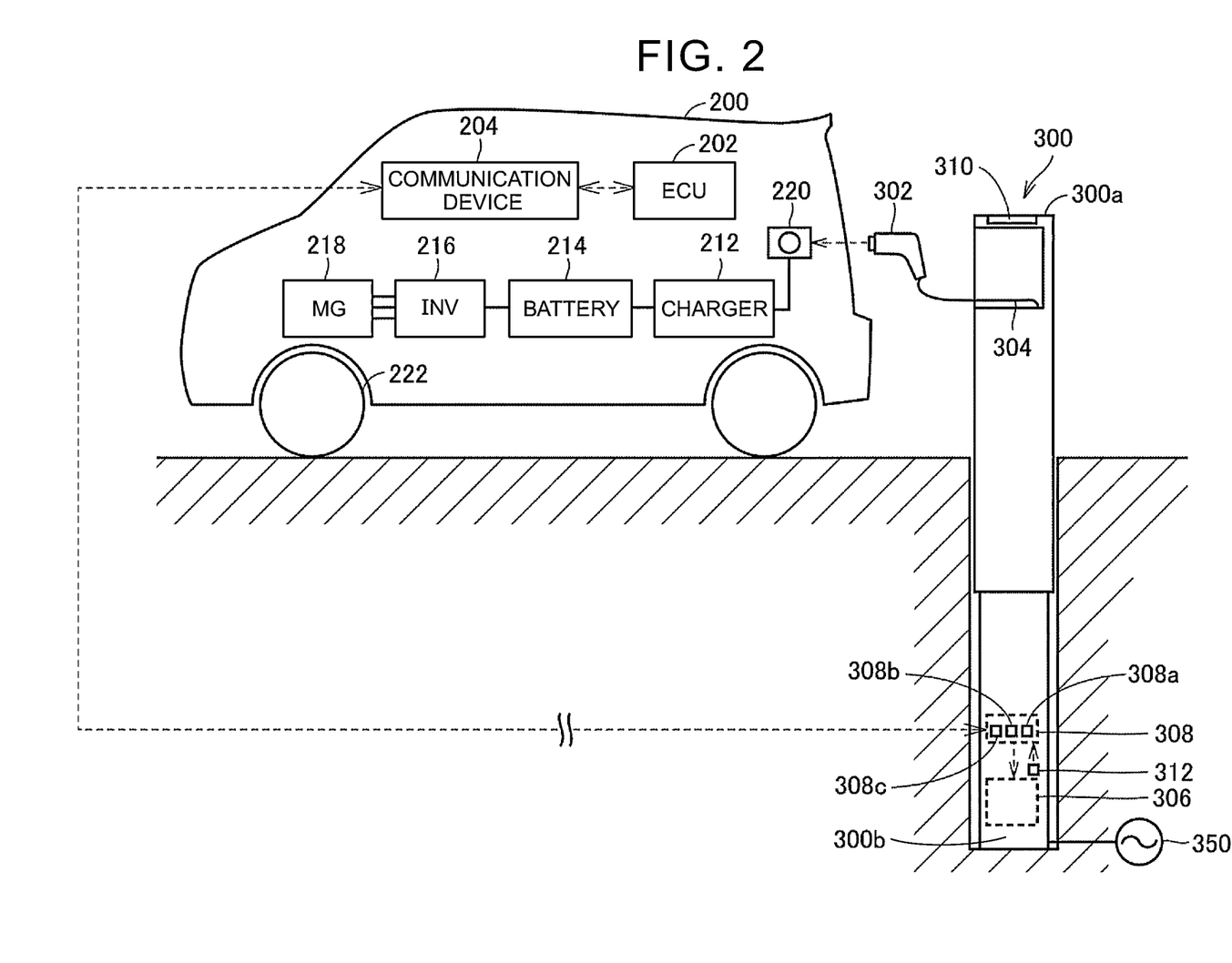
FIG. 2 is a diagram illustrating an example of the structures of the motor vehicle and the charging stand whose movable unit is exposed above the ground.

For example, description is given of the structure of a charging stand 300 serving as a charging apparatus according to the embodiment of the present disclosure. FIG. 1 is a diagram illustrating an example of the structures of a motor vehicle 200 and the charging stand 300 whose movable unit 300a (described later) is housed under the ground. FIG. 2 is a diagram illustrating an example of the structures of the motor vehicle 200 and the charging stand 300 whose movable unit 300a is exposed above the ground.

As illustrated in FIG. 1 and FIG. 2, the charging stand 300 is ascendable and descendable between a first state (see FIG. 1) in which the upper end is positioned substantially flush with the ground and the movable unit 300a is housed under the ground, and a second state (see FIG. 2) in which the upper end ascends to a predetermined position above the ground and the movable unit 300a is exposed.

For example, the charging stand 300 includes a cylindrical casing, and is installed at the bottom of a hollow in the ground. The hollow in the ground has a predetermined clearance from the outer peripheral surface of the casing of the charging stand 300, and the depth of the hollow is approximately equal to the vertical length of the charging stand 300 in the first state.

The charging stand 300 includes the movable unit 300a and a stationary unit 300b. A housing space that can house a connector 302 is formed at the top of the movable unit 300a. The connector 302 is connected to one end of a cable 304 whose other end is connected to a power supply 350. The power supply 350 is an alternating current (AC) power supply such as a commercial power supply. For example, the cable 304 includes a formative extensible and contractible portion including a curl portion, or a structural extensible and contractible portion including a take-up structure. When the connector 302 is carried, the cable 304 is extensible to an inlet 220 of the motor vehicle 200 parked in a parking space.

A weight sensor 310 is provided on the top surface of the movable unit 300a. The weight sensor 310 is a detection device configured to detect whether a heavy object is placed on the top surface of the movable unit 300a. Specifically, the weight sensor 310 detects a weight applied to the top surface of the movable unit 300a. The weight sensor 310 transmits a signal indicating the weight to a control device 308.

The stationary unit 300b is fixed to the bottom of the hollow in the ground. The stationary unit 300b may be fixed anywhere in the hollow in the ground, and need not particularly be fixed to the bottom of the hollow.

The stationary unit 300b includes an ascending and descending device 306 configured to cause the movable unit 300a to ascend or descend in a vertical direction, the control device 308 configured to control operations of the ascending and descending device 306, and a movement amount sensor 312.

The ascending and descending device 306 includes an actuator configured to cause the movable unit 300a to ascend or descend. For example, the ascending and descending device 306 may include a rack and pinion mechanism configured to cause the movable unit 300a to ascend or descend by rotating, with an electric actuator, a pinion gear meshing with a rack gear fixed to the movable unit 300a, a mechanism using a hydraulic cylinder in which a rod connected to a piston is fixed to the movable unit 300a, and configured to cause the movable unit 300a to ascend or descend by increasing or reducing a hydraulic pressure to be supplied to a cylinder body fixed to the stationary unit 300b, or a mechanism configured to cause the movable unit 300a to ascend or descend by generating a repulsive force with a magnetic force between the movable unit 300a and the stationary unit 300b.

The ascending and descending device 306 is configured such that the movable unit 300a does not descend below a position corresponding to the first state and does not ascend above a position corresponding to the second state by using, for example, stopper mechanisms.

The movement amount sensor 312 detects a movement amount of the movable unit 300a. For example, the movement amount sensor 312 detects an ascent or descent amount of the movable unit 300a using the ascending and descending device 306 as the movement amount of the movable unit 300a. The movement amount sensor 312 transmits a signal indicating the detected movement amount of the movable unit 300a to the control device 308. The movement amount sensor 312 may detect a condition amount corresponding to the ascent or descent amount, such as an actuation amount of the actuator, and the control device 308 may acquire the ascent or descent amount based on the detected condition amount.

The control device 308 includes a central processing unit (CPU) 308a, a memory 308b including a read only memory (ROM) and a random access memory (RAM), and a communicator 308c communicable with external devices. The control device 308 controls electric devices (for example, the ascending and descending device 306) provided in the charging stand 300 based on information stored in the memory 308b, information received via the communicator 308c, or information acquired from the weight sensor 310, the movement amount sensor 312, or other sensors (not illustrated). The electric devices may be controlled not only by a structure in which the CPU 300a executes software processes, but also by a structure constituted by dedicated hardware (electronic circuit).

The communicator 308c can communicate various types of information with devices outside the charging stand 300. FIG. 1 and FIG. 2 illustrate an example in which the communicator 308c and the motor vehicle 200 are communicable with each other. For example, the communicator 308c may communicate with a management server (not illustrated), with the motor vehicle 200 (specifically, a communication device 204 described later), with a mobile terminal (not illustrated) of a user who desires charging at the charging stand 300, or with other charging stands 300.

For example, the communicator 308c may communicate with the management server or other charging stands 300 through wired communication. Alternatively, the communicator 308c may communicate with the management server, the motor vehicle 200, the mobile terminal, or other charging stands 300 through, for example, wireless communication.

For example, when an execution condition for ascending control is satisfied, the control device 308 executes the ascending control on the ascending and descending device 306 to switch the charging stand 300 from the first state to the second state. For example, the execution condition for the ascending control includes a condition that the charging stand 300 is in the first state, and a condition that a request to execute the ascending control (hereinafter referred to as "ascending request") is made for the charging stand 300. For example, the ascending request may be received from the management server, the motor vehicle 200, the mobile terminal, or any other charging stand 300.

For example, when an execution condition for descending control is satisfied, the control device 308 executes the descending control on the ascending and descending device 306 to switch the charging stand 300 from the second state to the first state. For example, the execution condition for the descending control includes a condition that the charging stand 300 is in the second state, and a condition that a request to execute the descending control (hereinafter referred to as "descending request") is made for the charging stand 300. For example, the descending request may be received from the management server, the motor vehicle 200, the mobile terminal, or any other charging stand 300.

FIG. 1 and FIG. 2 further illustrate an example of the structure of the motor vehicle 200 parked in a parking space where charging is available at the charging stand 300. As illustrated in FIG. 1 and FIG. 2, the motor vehicle 200 is a vehicle including a power storage device, such as a plug-in hybrid vehicle or an electric vehicle. The motor vehicle 200 only needs to receive electric power supplied from the charging stand 300, and is not particularly limited to the vehicles exemplified above. For example, the motor vehicle 200 may be a vehicle including a power storage device for external power feed.

The motor vehicle 200 includes an electronic control unit (ECU) 202, the communication device 204, a charger 212, a battery 214, an inverter 216, a motor generator 218, and the inlet 220.

The ECU 202 includes a CPU and a memory including a ROM and a RAM. The ECU 202 controls electric devices (for example, the charger 212 or the inverter 216) provided in the motor vehicle 200 based on information stored in the memory or information acquired from sensors (not illustrated).

The communication device 204 can communicate various types of information with devices outside the motor vehicle 200. For example, the communication device 204 may communicate with the management server (not illustrated), with the mobile terminal (not illustrated) of the user who desires charging at the charging stand 300, or with other charging stands 300.

When AC power is supplied from the inlet 220, the charger 212 converts the supplied AC power into direct current (DC) power, and supplies the DC power to the battery 214. The battery 214 is charged through the operation of the charger 212. For example, the charger 212 is controlled based on a control signal from the ECU 202.

For example, the battery 214 is a rechargeable power storage element typified by a secondary battery such as a nickel-metal hydride battery or a lithium ion battery including a liquid or solid electrolyte. Alternatively, the battery 214 may be a power storage device that can store electric power. For example, a large-capacity capacitor may be used in place of the battery 214.

For example, the inverter 216 converts DC power of the battery 214 into AC power, and supplies the AC power to the motor generator 218. For example, the inverter 216 converts AC power from the motor generator 218 (regenerative power) into DC power, and supplies the DC power to the battery 214 to charge the battery 214.

The motor generator 218 gives a rotational force to driving wheels 222 by receiving electric power supplied from the inverter 216. The driving wheels 222 are rotated by the rotational force given from the motor generator 218 to cause the motor vehicle 200 to travel.

The inlet 220 is provided together with a cover (not illustrated) such as a lid at a part of the exterior of the motor vehicle 200. The inlet 220 is a power receiver configured to receive charging power supplied from an external charging apparatus (for example, the charging stand 300). The inlet 220 is shaped such that the connector 302 of the charging stand 300 is attachable to the inlet 220. Both the inlet 220 and the connector 302 include contacts. When the connector 302 is attached to the inlet 220, the contacts are brought into contact with each other, and the inlet 220 and the connector 302 are electrically connected together. At this time, the battery 214 of the motor vehicle 200 is chargeable with electric power supplied from the charging stand 300.

Figure 3:
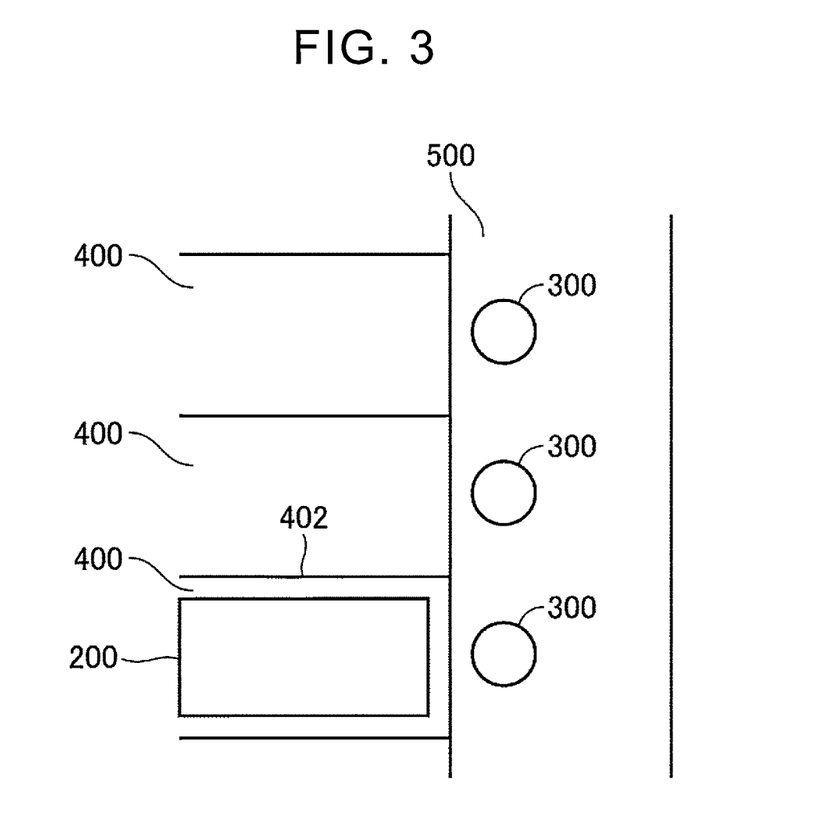
FIG. 3 is a diagram illustrating an example of a layout of charging stands and parking spaces.

The charging stands 300 may be installed on a sidewalk adjacent to a plurality of parking spaces in a parking lot, or on a sidewalk adjacent to a plurality of parking spaces set along a road. FIG. 3 is a diagram illustrating an example of a layout of the charging stands 300 and parking spaces 400. As illustrated in FIG. 3, when the parking spaces 400 are set side by side across partition lines 402 at a plurality of positions in a parking lot, the charging stands 300 are installed at positions adjacent to the respective parking spaces 400. For example, FIG. 3 illustrates a structure in which a sidewalk 500 is provided at one longitudinal end of each parking space 400 (right side on the drawing sheet of FIG. 3). In this case, the charging stands 300 are installed along the sidewalk 500. When the motor vehicle 200 is parked in any one of the parking spaces 400 and the charging stand 300 is in the second state, the user carries the connector 302 from the charging stand 300 and connects the connector 302 to the inlet 220 of the motor vehicle 200.

Figure 4:
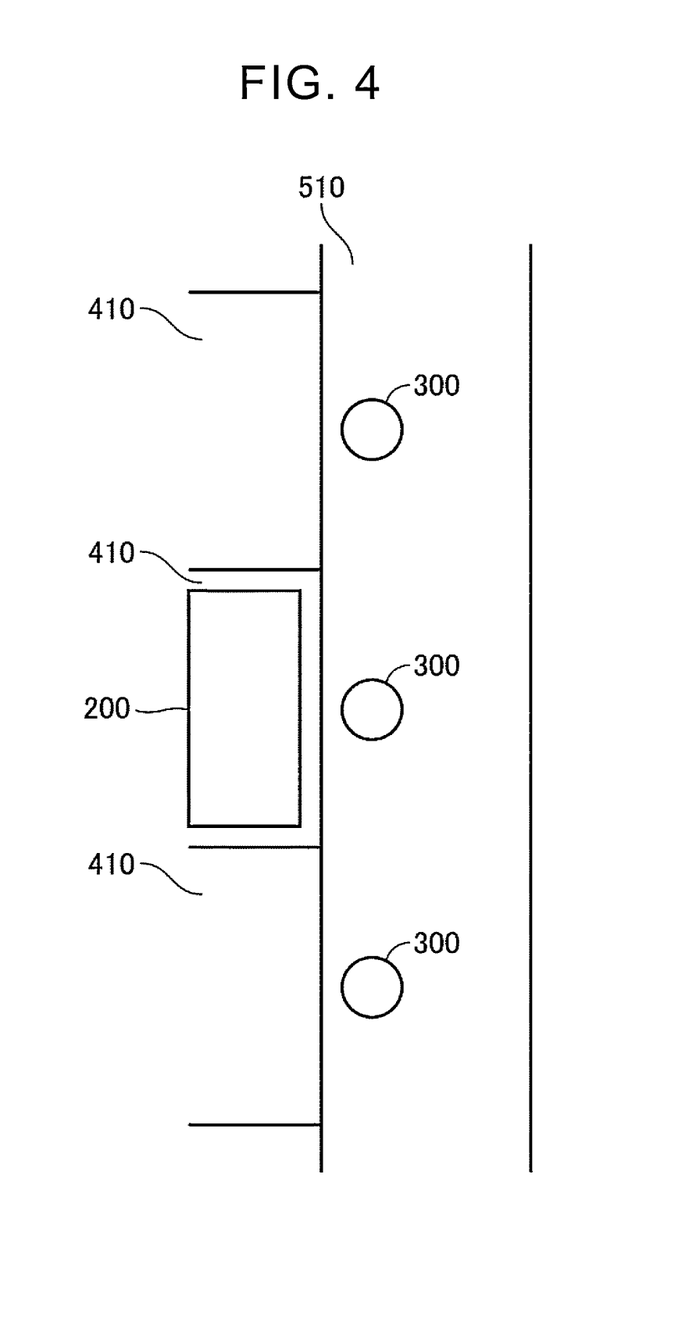
FIG. 4 is a diagram illustrating another example of the layout of the charging stands and the parking spaces.

FIG. 4 is a diagram illustrating another example of the layout of the charging stands 300 and parking spaces 410. As illustrated in FIG. 4, when the parking spaces 410 are set end to end across partition lines 412 at a plurality of positions along a road, the charging stands 300 are installed at positions adjacent to the respective parking spaces 410. For example, FIG. 4 illustrates a structure in which the parking spaces 410 are set along a sidewalk 510. In this case, the charging stands 300 are installed along the sidewalk 510. When the motor vehicle 200 is parked in any one of the parking spaces 410 and the charging stand 300 is in the second state, the user carries the connector 302 from the nearest charging stand 300 and connects the connector 302 to the inlet 220 of the motor vehicle 200.

When the charging stand 300 is in the first state, the user transmits an ascending request to the charging stand 300 by using the mobile terminal or via the management server. In response to the ascending request, the control device 308 of the charging stand 300 controls the ascending and descending device 306 to set the second state.

The movable charging stand 300 ascendable and descendable as described above may automatically be exposed above the ground by using the ascending and descending device 306 to improve convenience.

Figure 5:
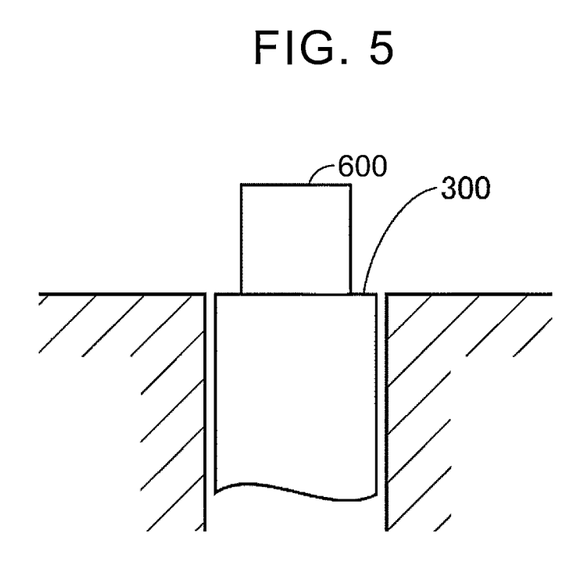
FIG. 5 is a diagram for describing a case where a heavy object is placed on the top surface of the charging stand.

When the charging stand 300 is caused to automatically ascend, however, an obstacle may be present above the charging stand 300 housed under the ground. FIG. 5 is a diagram for describing a case where a heavy object 600 is placed on the top surface of the charging stand 300. For example, the user may place the heavy object 600 on the top surface of the charging stand 300 as illustrated in FIG. 5, or the vehicle may ride onto a sidewalk and a tire may be present on the top surface of the charging stand 300. When the charging stand 300 is caused to ascend in this state, a load may be put on the ascending and descending device 306, thereby causing malfunction in the charging stand 300.

In this embodiment, the control device 308 of the charging stand 300 prohibits the ascent of the movable unit 300a when determination is made that the movable unit 300a is in the first state in which the movable unit 300a is housed under the ground and an obstacle is present above the movable unit 300a.

Through the operation described above, the ascent of the movable unit 300a is prohibited when determination is made that an obstacle is present above the movable unit 300a. Therefore, the load on the ascending and descending device 306 is suppressed. As a result, the malfunction of the charging stand 300 can be suppressed.

Figure 6:
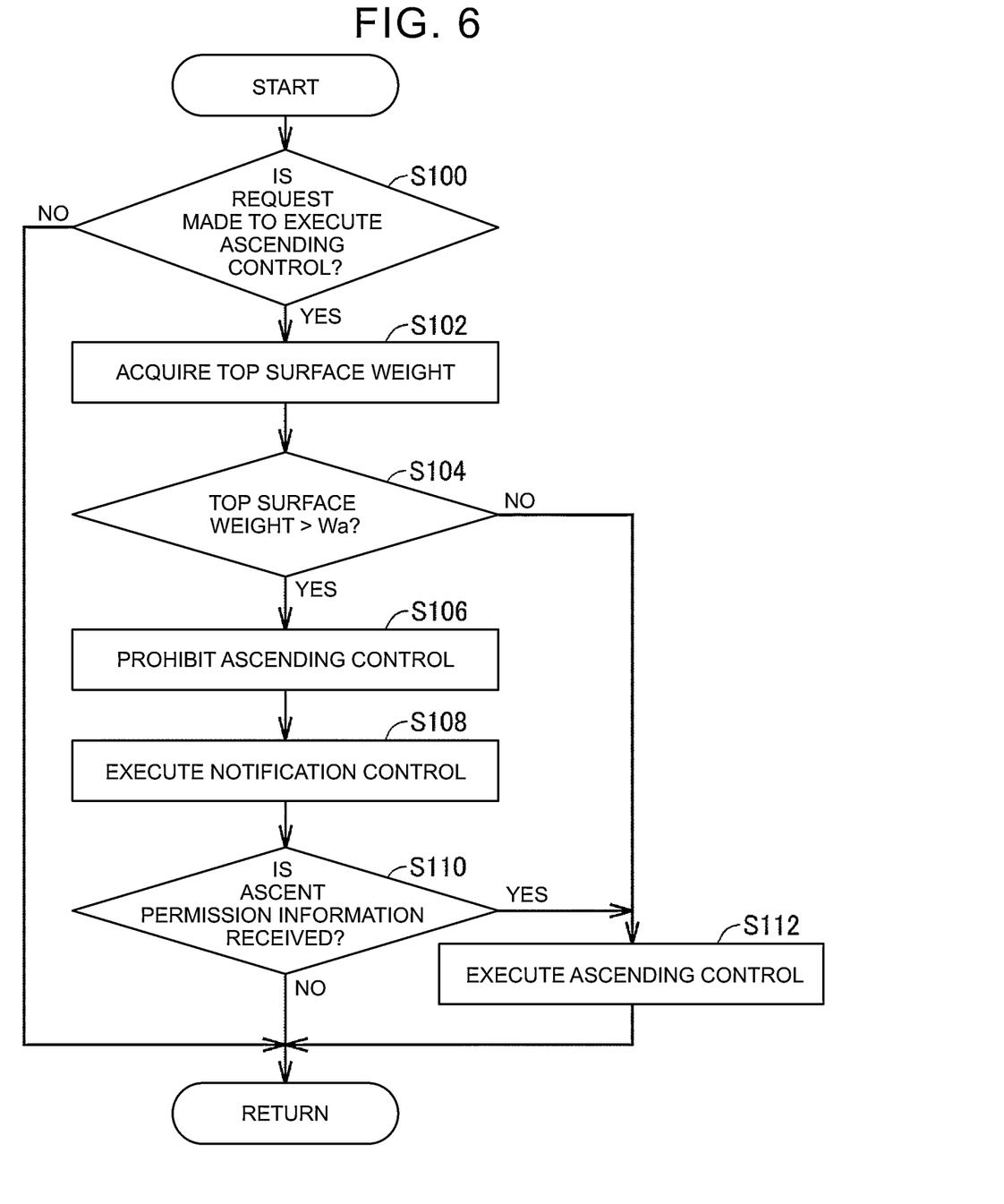
FIG. 6 is a flowchart illustrating an example of processes to be executed by a control device of the charging stand.

An example of control processes to be executed by the control device 308 is described below with reference to FIG. 6. FIG. 6 is a flowchart illustrating the example of the processes to be executed by the control device 308. The series of processes illustrated in this flowchart is repeated by the control device 308 in every predetermined control period.

In Step (hereinafter represented by "S") 100, the control device 308 determines whether a request is made to execute the ascending control. For example, the control device 308 may determine that the request is made to execute the ascending control when a current time is within a time frame to execute the ascending control. Alternatively, the control device 308 may determine that the request is made to execute the ascending control when information indicating the request to execute the ascending control is received via the communicator 308c from an external device such as the management server, the motor vehicle 200, the mobile terminal, or any other charging stand 300. When determination is made that the request is made to execute the ascending control ("YES" in S100), the processes proceed to S102.

In S102, the control device 308 acquires a weight applied to the top surface of the movable unit 300a (hereinafter referred to as "top surface weight"). For example, the control device 308 acquires, as the top surface weight, a weight detected by using the weight sensor 310.

In S104, the control device 308 determines whether the acquired top surface weight is larger than a threshold Wa. When determination is made that the top surface weight is larger than the threshold Wa ("YES" in S104), the processes proceed to S106. The threshold Wa is an example of a first threshold.

In S106, the control device 308 prohibits the ascending control because an obstacle is present above the movable unit 300a.

In S108, the control device 308 executes notification control. The notification control includes control for transmitting information on an inquiry about whether to permit the ascent of the movable unit 300a to the management server, the motor vehicle 200, or the mobile terminal.

In S110, the control device 308 determines whether information indicating permission of the ascent of the movable unit 300a is received from the external device. When the user inputs the information indicating the permission of the ascent of the movable unit 300a to, for example, the mobile terminal or an input device of the motor vehicle 200, the mobile terminal or the motor vehicle 200 transmits the input information to the charging stand 300 directly or via the management server. For example, the control device 308 determines that the information indicating the permission of the ascent of the movable unit 300a is received from the external device when the information is received before a predetermined period elapses from the timing of the prohibition of the ascending control. When determination is made that the information indicating the permission of the ascent of the movable unit 300a is received from the external device ("YES" in S110), the processes proceed to S112.

In S112, the control device 308 executes the ascending control. The control device 308 controls the ascending and descending device 306 to cause the movable unit 300a to ascend to the position corresponding to the second state. When determination is made that the information indicating the permission of the ascent of the movable unit 300a is not received from the external device ("NO" in S110), the processes are terminated.

Figure 7:
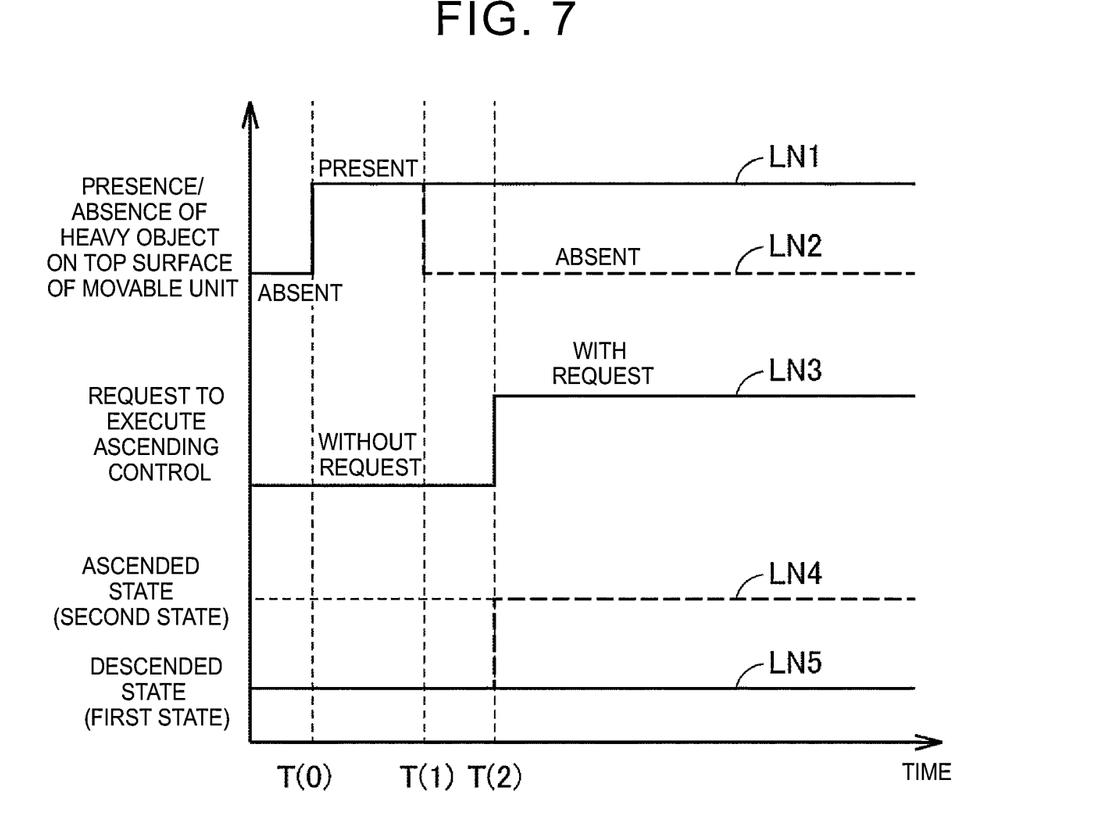
FIG. 7 is a timing chart for describing an example of operations of the control device of the charging stand.

Referring to FIG. 7, description is given of an example of operations of the control device 308 of this embodiment based on the structure and flowchart described above. FIG. 7 is a timing chart for describing the operations of the control device 308 of the charging stand 300. A vertical axis of FIG. 7 represents whether a heavy object is present, whether an ascending request is made for the charging stand 300, and an ascended or descended state of the charging stand 300. A horizontal axis of FIG. 7 represents time. In FIG. 7, "LN1" represents an example of a change in terms of whether a heavy object is present. In FIG. 7, "LN2" represents another example of the change in terms of whether a heavy object is present. In FIG. 7, "LN3" represents a change in terms of whether an ascending request is made for the charging stand 300. In FIG. 7, "LN4" represents an example of a change in the ascended or descended state of the charging stand 300. In FIG. 7, "LN5" represents another example of the change in the ascended or descended state of the charging stand 300. For example, it is assumed that the charging stand 300 is in a descended state (first state).

For example, as represented by "LN1" in FIG. 7, it is assumed that a heavy object such as baggage whose weight is larger than the threshold Wa is placed on the top surface of the movable unit 300a of the charging stand 300 at a time T(0), and this state is kept after the time T(0).

When a request is made to execute the ascending control ("YES" in S100) at a time T(2) as represented by "LN3" in FIG. 7, a top surface weight is acquired (S102). Since the acquired top surface weight is larger than the threshold Wa ("YES" in S104), the ascending control is prohibited (S106), and the notification control is executed (S108). Therefore, the descended state of the charging stand 300 is kept as represented by "LN5" in FIG. 7. By executing the notification control, information on an inquiry about whether to permit the ascent of the movable unit is transmitted to the user. When the user removes the heavy object and transmits information indicating permission of the ascent of the movable unit 300a to the charging stand 300, the ascending control is executed. When the user does not transmit the information, the descended state is kept.

As represented by "LN2" in FIG. 7, it is assumed that a heavy object such as baggage whose weight is larger than the threshold Wa is placed on the top surface of the movable unit 300a of the charging stand 300 at the time T(0), and then the placed heavy object is removed at a time T(1).

When a request is made to execute the ascending control ("YES" in S100) at the time T(2) as represented by "LN3" in FIG. 7, a top surface weight is acquired (S102). Since the acquired top surface weight is equal to or smaller than the threshold Wa ("NO" in S104), the ascending control is executed (S112). Therefore, the charging stand 300 is switched from the first state to the second state as represented by "LN4" in FIG. 7.

In the charging stand 300 serving as the charging apparatus according to this embodiment described above, the ascent of the movable unit 300a is prohibited when determination is made that an obstacle is present above the movable unit 300a. Therefore, the load on the ascending and descending device 306 is suppressed. As a result, the malfunction of the charging stand 300 can be suppressed. Thus, it is possible to provide a charging apparatus that suppresses malfunction when an obstacle is present above the charging apparatus.

When the ascent of the movable unit 300a is prohibited, the information on the inquiry about whether to permit the ascent of the movable unit 300a is transmitted to the external device. The prohibition of the ascent of the movable unit 300a is terminated when the information indicating the permission of the ascent of the movable unit 300a is received from the external device. Therefore, the operations of the ascending and descending device 306 can be controlled to switch the movable unit 300a from the first state to the second state in response to the user's request.

Whether an obstacle is present above the movable unit can be determined with high accuracy by using the weight sensor 310.

Modified examples are described below. In the embodiment described above, the power supply 350 is the AC power supply, but may be a DC power supply. In this case, the motor vehicle 200 may be, for example, structured such that the charger 212 is omitted.

The embodiment described above is directed to, for example, the structure in which the connector 302 is housed in the housing space at the top of the movable unit 300a. For example, a socket may be exposed on the side of the top of the movable unit 300a. With this structure, the user can charge the battery 214 mounted on the motor vehicle 200 by connecting the inlet 220 of the motor vehicle 200 to the socket of the charging stand 300 with an outlet cable prepared separately. Alternatively, a terminal connectable to an inlet provided at the bottom of the motor vehicle 200 may be provided at the top of the movable unit 300a. With this structure, the inlet of the motor vehicle 200 and the charging stand are electrically connected by setting the movable unit 300a into the second state. Therefore, the user can charge the battery 214 mounted on the motor vehicle 200 without connecting the inlet of the motor vehicle 200 and the charging stand.

In the embodiment described above, the casing of the charging stand 300 has, for example, the cylindrical shape, but only needs to have a shape in which the ascending and descending operations are possible, and the shape is not particularly limited to the cylindrical shape. For example, the casing of the charging stand 300 may have a rectangular parallelepiped shape.

In the embodiment described above, determination is made as to whether an obstacle is present above the movable unit 300a based on the detection result from the weight sensor 310. The sensor for detecting whether an obstacle is present above the movable unit 300a is not particularly limited to the weight sensor 310, and may be, for example, a measurement device provided above the movable unit 300a in place of the weight sensor 310 and configured to measure a distance from an obstacle above the movable unit 300a. Examples of the measurement device include an ultrasonic sensor and a camera. That is, the control device 308 may measure a distance from an obstacle above the movable unit 300a in the first state, and determine that the obstacle is present above the movable unit when the measured distance from the obstacle is smaller than a third threshold.

Figure 8:
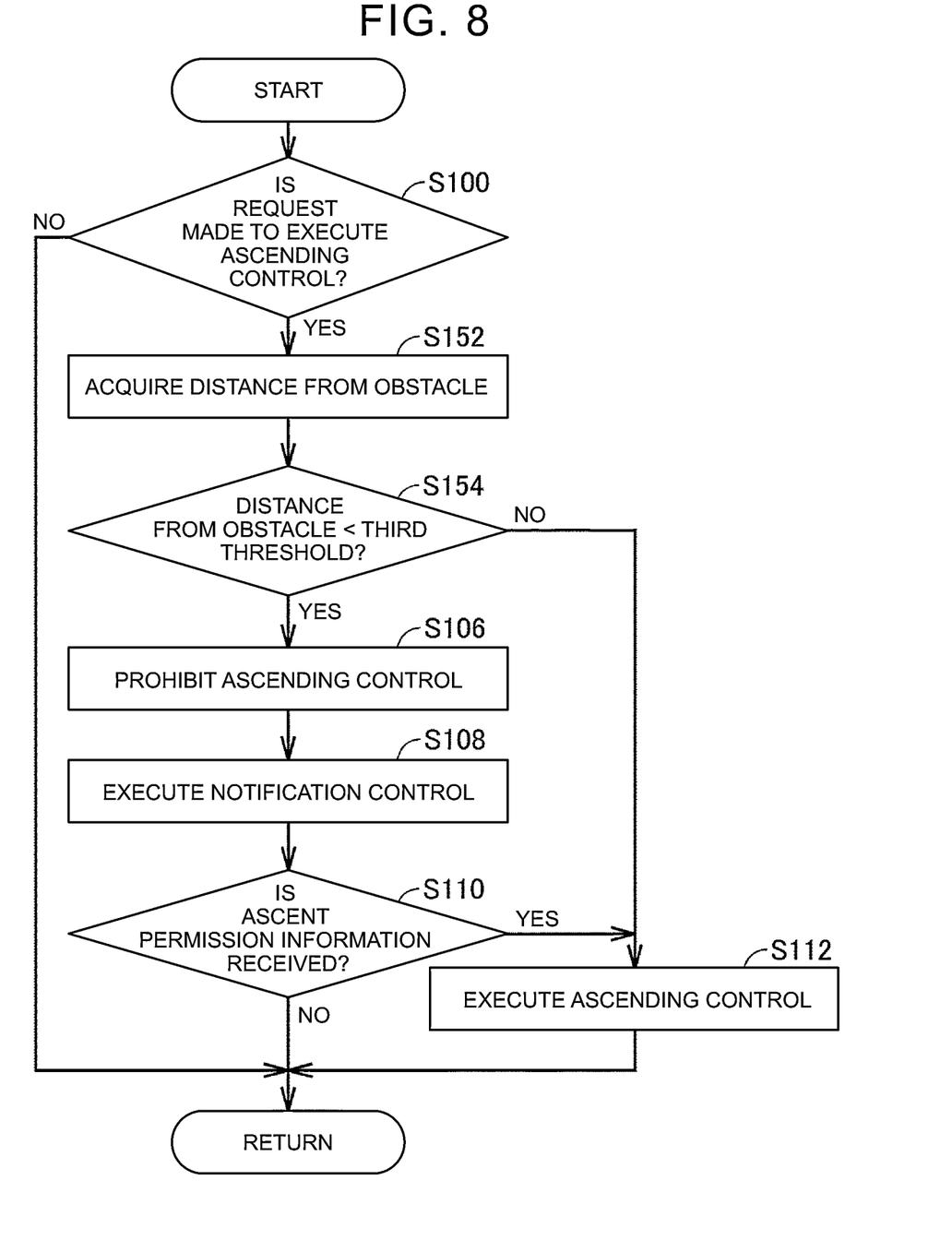
FIG. 8 is a flowchart illustrating an example of processes to be executed by the control device of the charging stand according to a modified example.

In this case, the control device 308 executes processes illustrated in a flowchart of FIG. 8. FIG. 8 is a flowchart illustrating an example of the processes to be executed by the control device of the charging stand according to a modified example. The flowchart of FIG. 8 differs from the flowchart of FIG. 6 in that a process of acquiring a distance from an obstacle by using the measurement device is executed as a process of S152 in place of the process of S102 and a process of determining whether the distance from the obstacle is smaller than the third threshold is executed as a process of S154 in place of the process of S104. The other processes are similar to the processes illustrated in the flowchart of FIG. 6, and therefore detailed description is not repeated. Also in this case, whether an obstacle is present above the movable unit 300a can be determined with high accuracy, and the ascent of the movable unit 300a is prohibited when determination is made that the obstacle is present. Therefore, the load on the ascending and descending device 306 is suppressed.

In the embodiment described above, determination is made as to whether an obstacle is present above the movable unit 300a based on the detection result from the weight sensor 310. The sensor for detecting whether an obstacle is present above the movable unit 300a is not particularly limited to the weight sensor 310, and may be, for example, the movement amount sensor 312. That is, the control device 308 may determine that an obstacle is present above the movable unit 300a when the movement amount sensor 312 detects that the movable unit 300a does not move though an ascending force is applied to the movable unit 300a in the first state.

Figure 9:
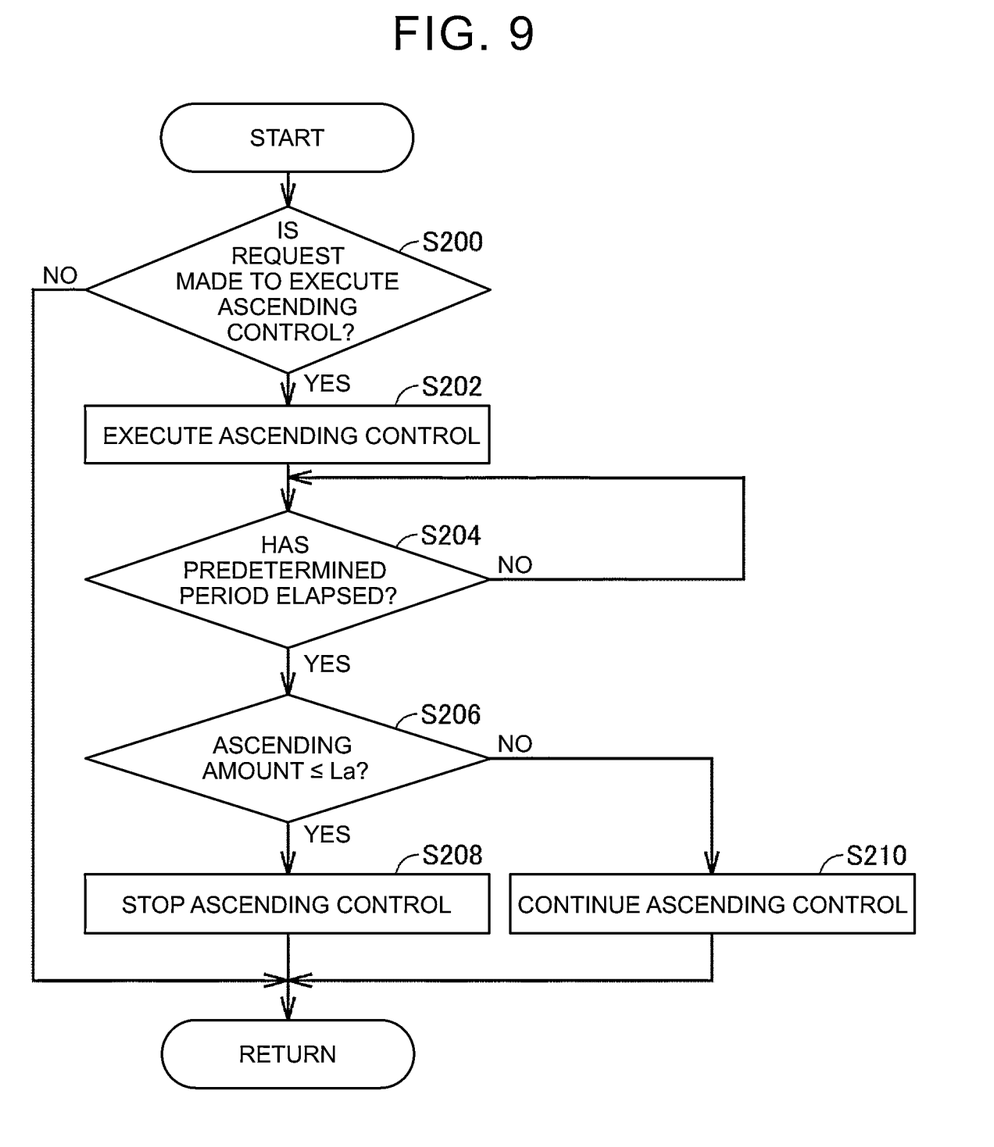
FIG. 9 is a flowchart illustrating another example of the processes to be executed by the control device of the charging stand according to the modified example.

FIG. 9 is a flowchart illustrating an example of processes to be executed by the control device of the charging stand according to a modified example.

In S200, the control device 308 determines whether a request is made to execute the ascending control. The determination method is similar to the determination method in the process of S100 in the flowchart of FIG. 6, and therefore detailed description is not repeated. When determination is made that the request is made to execute the ascending control ("YES" in S200), the processes proceed to S202.

In S202, the control device 308 executes the ascending control. That is, the control device 308 controls the ascending and descending device 306 to switch the first state to the second state.

In S204, the control device 308 determines whether a predetermined period has elapsed from the timing of execution of the ascending control. For example, the predetermined period is set so that the load on the ascending and descending device 306 does not cause malfunction even though the movable unit 300a cannot ascend due to a heavy object placed on the top surface of the movable unit 300a. The predetermined period is adjusted through experiment or the like. When determination is made that the predetermined period has elapsed ("YES" in S204), the processes proceed to S206. When determination is made that the predetermined period has not elapsed ("NO" in S204), the processes return to S204.

In S206, the control device 308 determines whether the ascending amount of the movable unit 300a is equal to or smaller than a threshold La. The control device 308 acquires the ascending amount of the movable unit 300a based on a detection result from the movement amount sensor 312. For example, the threshold La is a lower limit value of a range in which the movable unit 300a may ascend when the ascending control is continued for the predetermined period. The threshold La is a predetermined value adjusted through experiment or the like. When determination is made that the ascending amount of the movable unit 300a is equal to or smaller than the threshold La ("YES" in S206), the processes proceed to S208. The threshold La is an example of a second threshold.

In S208, the control device 308 prohibits the ascending control. For example, the control device 308 may control the ascending and descending device 306 to set the first state.

In S210, the control device 308 continues the ascending control. The control device 308 controls the ascending and descending device 306 to set the second state.

Description is given of operations of the control device 308 according to the modified example described above. It is assumed that a heavy object such as a person or baggage is present on the top surface of the movable unit 300a of the charging stand 300. When a request is made to execute the ascending control ("YES" in S200), the ascending control is executed (S202). When the predetermined period has elapsed from the timing of execution of the ascending control ("YES" in S204), determination is made as to whether the ascending amount is equal to or smaller than the threshold La (S206). When the movable unit 300a does not ascend due to the placed heavy object, determination is made that the ascending amount is equal to or smaller than the threshold La ("YES" in S206). Then, the ascending control is prohibited (S208).

Also in this case, the ascent of the movable unit 300a is prohibited when the heavy object is placed on the top surface of the movable unit 300a. Therefore, the load on the ascending and descending device 306 is suppressed. As a result, the malfunction of the charging stand 300 can be suppressed.

All or part of the modified examples may be combined as appropriate. It should be understood that the embodiment disclosed herein is illustrative but is not limitative in all respects. The scope of the present disclosure is defined by the claims rather than the above description, and is intended to encompass meanings of equivalents to the elements in the claims and all modifications within the scope of the claims.

What is claimed is:

1. A charging apparatus installed at a bottom of a hollow in a ground and configured to charge a power storage device mounted on a vehicle, the charging apparatus comprising:
   a movable unit including a connection device configured to connect to the power storage device:
   an ascending and descending device configured to cause the movable unit to ascend or descend between a first state and a second state, the first state being a state in which the movable unit is housed under the ground, the second state being a state in which the movable unit is exposed above the ground and the power storage device and the connection device are connectable together;
   a detection device configured to detect an obstacle above the movable unit; and
   a control device configured to
      control operations of the ascending and descending device, and
      prohibit ascent of the movable unit when determination is made that the movable unit is in the first state and the obstacle is present above the movable unit based on a detection result from the detection device,
   wherein the control device is configured to:
      communicate with a device outside the charging apparatus;
      when the ascent of the movable unit is prohibited, transmit information on an inquiry about whether to permit the ascent of the movable unit to the device outside the charging apparatus; and
      terminate prohibition of the ascent of the movable unit when information indicating permission of the ascent of the movable unit is received from the device outside the charging apparatus.

2. The charging apparatus according to claim 1, wherein the detection device is configured to detect a weight of the obstacle placed on a top surface of the movable unit, and
   the control device is configured to determine that the obstacle is present above the movable unit in response to the weight of the obstacle detected by the detection device being larger than a first threshold.

3. The charging apparatus according to claim 2, wherein the detection device is configured to detect a condition amount corresponding to a movement amount of the movable unit, and
   the control device is configured to determine that the obstacle is present above the movable unit in response to the movement amount of the movable unit based on a result of detection of the condition amount during application of an ascending force to the movable unit in the first state using the ascending and descending device being smaller than a second threshold.

4. The charging apparatus according to claim 2, wherein upon determining that the obstacle is present above the movable unit, the control device is configured to not permit the ascent of the movable unit until the information indicating permission of the ascent of the movable unit is received from the device outside the charging apparatus.

5. The charging apparatus according to claim 1, wherein the detection device is configured to detect a condition amount corresponding to a movement amount of the movable unit, and
   the control device is configured to determine that the obstacle is present above the movable unit in response to the movement amount of the movable unit based on a result of detection of the condition amount during application of an ascending force to the movable unit in the first state using the ascending and descending device being smaller than a second threshold.

6. The charging apparatus according to claim 5, wherein the control device is configured to execute an operation of the ascending and descending device to switch the first state to the second state, and in response to determining a predetermined period having elapsed from a timing of execution of the operation of the ascending and descending device to switch the first state to the second state, determine whether the movement amount of the movable unit is smaller than the second threshold.

7. The charging apparatus according to claim 6, wherein the second threshold is a lower limit value of a range in which the movable unit ascends when the operation of the ascending and descending device to switch the first state to the second state is continued for the predetermined period.

8. The charging apparatus according to claim 1, wherein the detection device is configured to detect a distance from the obstacle above the movable unit, and the control device is configured to determine that the obstacle is present above the movable unit in response to the distance detected by the detection device being smaller than a third threshold.

9. The charging apparatus according to claim 8, wherein the detection device includes an ultrasonic sensor and a camera.

10. The charging apparatus according to claim 8, wherein the detection device is configured to detect a condition amount corresponding to a movement amount of the movable unit, and the control device is configured to determine that the obstacle is present above the movable unit in response to the movement amount of the movable unit based on a result of detection of the condition amount during application of an ascending force to the movable unit in the first state using the ascending and descending device being smaller than a second threshold.

11. The charging apparatus according to claim 10, wherein the detection device includes an ultrasonic sensor and a camera.

* * * * *